(12) United States Patent
Commenda et al.

(10) Patent No.: US 9,803,576 B2
(45) Date of Patent: Oct. 31, 2017

(54) SYSTEM AND METHOD TO PREDICT CALIBRATION VALUES BASED ON EXISTING CALIBRATIONS

(71) Applicant: Robert Bosch GmbH, Stuttgart (DE)

(72) Inventors: Roland Commenda, Northville, MI (US); Kevin Respondek, Livonia, MI (US); Jason Zink, Milford, MI (US); Lukas Speer, Sindelfingen (DE); Soundararajan Srinivasan, Sunnyvale, CA (US); Joel Janai, Tubingen (DE); Courtland A. VanDam, East Lansing, MI (US)

(73) Assignee: Robert Bosch GmbH, Stuttgart (DE)

( * ) Notice: Subject to any disclaimer, the term of this patent is extended or adjusted under 35 U.S.C. 154(b) by 87 days.

(21) Appl. No.: 15/045,033

(22) Filed: Feb. 16, 2016

(65) Prior Publication Data

US 2017/0234251 A1     Aug. 17, 2017

(51) Int. Cl.
| | |
|---|---|
| G06F 19/00 | (2011.01) |
| F02D 41/04 | (2006.01) |
| G07C 5/08 | (2006.01) |
| F02D 41/14 | (2006.01) |
| F02D 41/30 | (2006.01) |

(52) U.S. Cl.
CPC ......... *F02D 41/04* (2013.01); *F02D 41/1401* (2013.01); *F02D 41/30* (2013.01); *G07C 5/0808* (2013.01); *F02D 2041/1412* (2013.01)

(58) Field of Classification Search
USPC .................................................. 701/1, 33.1
See application file for complete search history.

(56) References Cited

U.S. PATENT DOCUMENTS

| | | | |
|---|---|---|---|
| 5,121,337 A | 6/1992 | Brown | |
| 6,407,685 B1 | 6/2002 | Händel et al. | |
| 7,684,945 B2 | 3/2010 | Walter et al. | |
| 7,899,699 B1 | 3/2011 | Kumar | |
| 8,862,316 B2 * | 10/2014 | Protin | F02D 41/0025 701/29.1 |
| 8,880,277 B2 * | 11/2014 | Julson | G06F 17/00 701/29.1 |
| 8,903,597 B2 * | 12/2014 | Jones | B60R 16/02 701/31.4 |
| 8,970,359 B2 * | 3/2015 | Barth | G07C 5/006 340/425.5 |
| 9,117,318 B2 * | 8/2015 | Ricci | H04W 48/04 |
| 9,285,007 B2 * | 3/2016 | Fazeli | F16F 9/3264 |
| 9,607,444 B2 * | 3/2017 | Cawse | G07C 5/008 |

(Continued)

*Primary Examiner* — Ronnie Mancho
(74) *Attorney, Agent, or Firm* — Michael Best & Friedrich LLP

(57) ABSTRACT

A system to predict calibration values for a vehicle. The system is configured to receive a plurality of training data sets for a component of the vehicle. Each of the plurality of training data sets includes one or more training inputs and one or more corresponding training outputs. The system is further configured to automatically develop a prediction model based on the plurality of training data sets. The system is further configured to receive an input data set and determine, using the prediction model, a predicted calibration value based on the input data set. The system is further configured to transmit the predicted calibration value to an electronic control unit of the vehicle.

20 Claims, 4 Drawing Sheets

(56) References Cited

U.S. PATENT DOCUMENTS

| | | |
|---|---|---|
| 9,639,996 B2* | 5/2017 | Treharne .............. G07C 5/0808 |
| 2009/0038589 A1* | 2/2009 | Dingle ................ F02D 41/3827 |
| | | 123/480 |
| 2011/0054864 A1 | 3/2011 | Lundstedt et al. |
| 2011/0270559 A1 | 11/2011 | Christophersen et al. |
| 2013/0006496 A1 | 1/2013 | Sherwin et al. |
| 2015/0019185 A1 | 1/2015 | Cunningham et al. |
| 2015/0039278 A1 | 2/2015 | Hale |
| 2016/0035157 A1* | 2/2016 | Willard ................. B60T 17/221 |
| | | 701/29.1 |

* cited by examiner

SYSTEM AND METHOD TO PREDICT CALIBRATION VALUES BASED ON EXISTING CALIBRATIONS

FIELD

Embodiments of the invention relate to the field of automotive control systems.

BACKGROUND

Vehicles and automotive control systems are increasingly complex. A vehicle's automotive control systems include multiple vehicles subsystems that control, for example, the powertrain, braking, steering, fuel, and exhaust systems. Each subsystem is controlled by one or more controllers (e.g., a microprocessor). The controllers receive sensor values and transmit commands to various components to control the vehicle.

SUMMARY

To provide proper operation, vehicle controllers are calibrated based on numerous factors, including the mechanical configuration and desired operation of the vehicle. Each sensor, controllable component, and software module in the vehicle is associated with at least one calibration value. Accordingly, the aggregate calibration values for a single vehicle can total in the tens of thousands. For example, configuring the control systems for a new vehicle platform (e.g., a new vehicle model) may require determining thirty to thirty-five thousand calibration values. Additionally, when a vehicle's design or configuration is changed, new calibration values are determined based on the new design or configuration, which is a difficult and time-consuming process. In some embodiments, a new calibration value can be obtained from existing calibration values. However, in many instances, existing calibration values do not exist or are not compatible with a new design or configuration.

Calibration values can be determined via experimentation. However, in some embodiments, unless a starting value is known for a calibration value, determining a calibration value via experimentation can be a timely and expensive process.

Therefore, embodiments of the invention provide systems and methods for automatically predicting calibration values for a vehicle. In one embodiment, the invention provides a system to predict calibration values for a vehicle. The system includes an electronic processor. The electronic processor is configured to receive a plurality of training data sets for a component of the vehicle. Each of the plurality of training data sets includes one or more training inputs and one or more corresponding training outputs. The electronic processor is further configured to automatically develop a prediction model based on the plurality of training data sets. The electronic processor is further configured to receive an input data set and determine, using the prediction model, a predicted calibration value based on the input data set. The electronic processor is further configured to transmit the predicted calibration value to an electronic control unit of the vehicle. In some embodiments, the electronic processor is further configured to normalize the plurality of training data sets.

In some embodiments, transmitting the predicted calibration value to the electronic control unit includes transmitting a lookup table that includes the input data set and the predicted calibration value.

In some embodiments, the calibration value is transmitted to the electronic control unit over a connection external to the vehicle.

In some embodiments, automatically developing the prediction model includes selecting a learning engine from a plurality of learning engines. In some embodiments, the electronic processor is configured to select the learning engine from the plurality of learning engines based on the plurality of training data sets.

In another embodiment the invention provides a method to predict calibration values for a vehicle. The method includes receiving a plurality of training data sets for a component of the vehicle. The method further includes automatically developing a prediction model based on the plurality of training data sets. The method further includes receiving an input data set and determining, using the prediction model, a predicted calibration value based on the input data set. The method further includes transmitting the predicted calibration value to an electronic control unit of the vehicle.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

Embodiments of the systems and methods described herein relate to predicting calibration values for a fuel injection system included in a vehicle. However, the systems and methods may be used to determine other types of calibration values for a vehicle, and are not limited by the use of the example described herein. For example, in some embodiments, the prediction values described herein can be used with hybrid or electric vehicles or can be used with other vehicle systems, such as a braking system.

Figure 1:
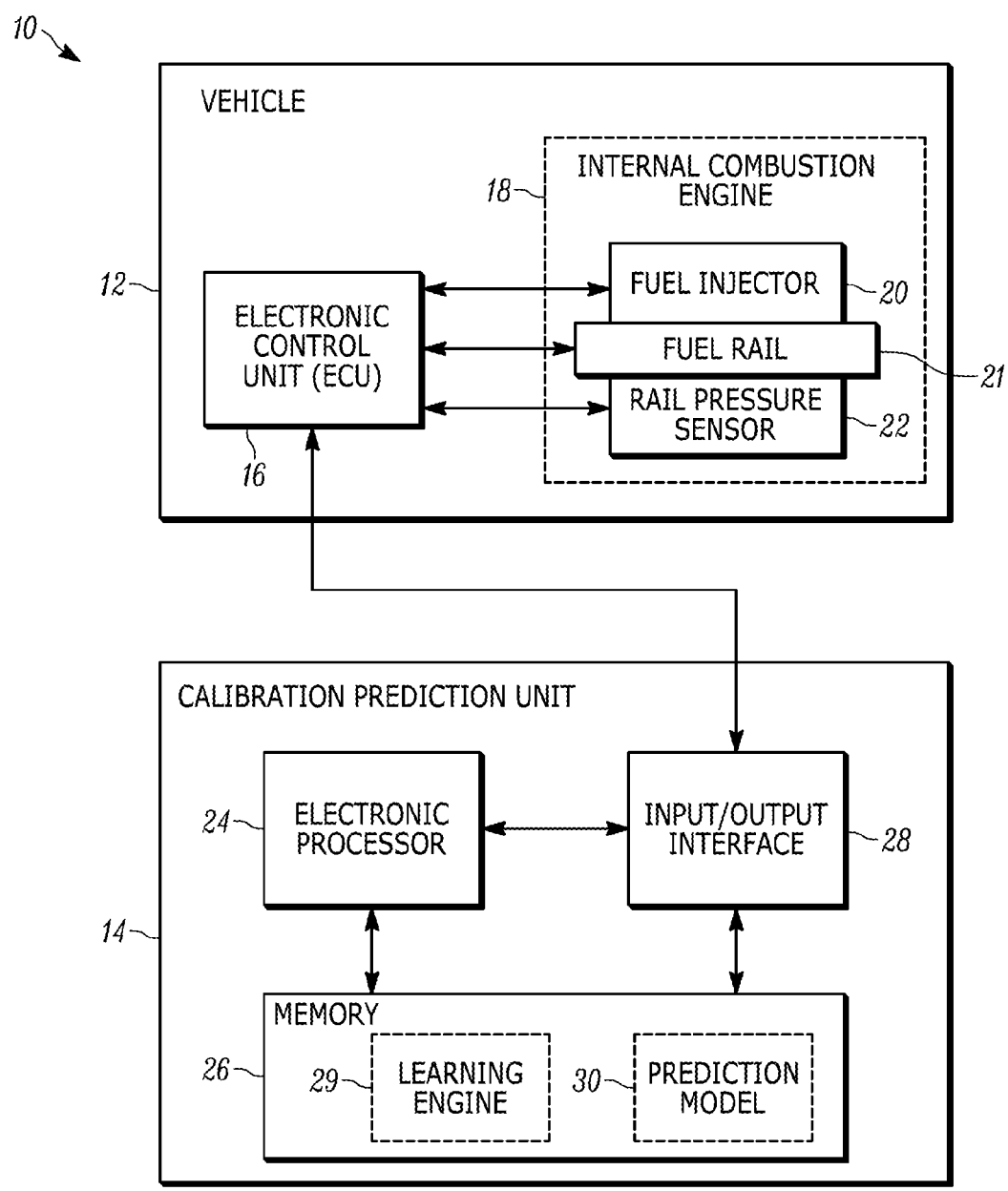
FIG. 1 is a block diagram illustrating a system for automatically predicting calibration values according to some embodiments of the invention.

FIG. 1 illustrates a system 10 for predicting calibration values. The system 10 includes a vehicle 12 and a calibration prediction unit 14. The vehicle 12 includes an electronic control unit ("ECU") 16 and an internal combustion engine 18. The vehicle 12 may be, for example, an automobile.

In some embodiments, the ECU 16 includes a plurality of electrical and electronic components that provide power, operational control, and protection to the components and modules within the ECU 16. The ECU 16 includes, among other things, an electronic processing unit (e.g., a microprocessor or another suitable programmable device), non-transitory memory (e.g., a computer-readable storage medium), and an input/output interface. The processing unit, the memory, and the input/output interface communicate over one or more control or data buses. It should be understood that the ECU 16 includes additional, fewer, or different components.

In some embodiments, the ECU 16 is implemented partially or entirely on a semiconductor (e.g., a field-programmable gate array ("FPGA") semiconductor) chip. The memory of the ECU 16 can include a program storage area and a data storage area. The program storage area and the data storage area can include combinations of different types of memory, such as read-only memory ("ROM"), random access memory ("RAM") (e.g., dynamic RAM ("DRAM"), synchronous DRAM ("SDRAM"), etc.), electrically erasable programmable read-only memory ("EEPROM"), flash memory, a hard disk, an SD card, or other suitable memory devices. The processing unit executes computer readable instructions ("software") stored in the memory. The software can include firmware, one or more applications, program data, filters, rules, one or more program modules, and other executable instructions. For example, the software can include instructions for and associated data for controlling the vehicle 12, such as the engine 18.

As schematically illustrated in FIG. 1, the engine 18 includes a fuel injector 20, a fuel rail 21, and a fuel rail pressure sensor 22. The fuel injector 20 injects fuel into the cylinders of the engine 18, and the fuel rail 21 provides a quantity of pressurized fuel to the fuel injector 20. During operation of the vehicle 12, the ECU 16 determines the quantity of fuel that should be injected into the cylinders of the engine 18 by the fuel injector 20. The ECU 16 also controls the supply of fuel to the fuel rail 21. The fuel rail pressure sensor 22 senses the pressure in the fuel rail 21 and communicates the pressure to the ECU 16. For illustrative purposes, the engine 18 includes a single fuel injector 20, fuel rail 21, and fuel rail pressure sensor 22. However, it should be understood that other configurations of the engine 18 can include more or fewer of each component as well as other components relating to the functions of the engine 18 (e.g., air intake, exhaust).

As illustrated in FIG. 1, in some embodiments, the ECU 16, the engine 18, the fuel injector 20, and the fuel rail pressure sensor 22 are electrically connected over a data bus or a wired, wireless, or optical connection that enables the components to communicate using network communications protocols, for example, the CAN protocol.

As also illustrated in FIG. 1, in one embodiment, the calibration prediction unit 14 includes an electronic processor 24 (e.g., a microprocessor or another suitable programmable device), non-transitory memory 26 (e.g., a computer-readable storage medium), and an input/output interface 28. The calibration prediction unit 14 is coupled to and can receive data from and transmit data to the ECU 16 over one or more wired or wireless connections. The calibration prediction unit 14 is described herein as a computer external to the vehicle 12 that communicates with the ECU 16 over at least one connection external to the vehicle 12. However, in alternative embodiments, the calibration prediction unit 14 is integrated into the vehicle 12.

The electronic processor 24, the memory 26, and the input/output interface 28 communicate over one or more control or data buses. The memory 26 can include a program storage area (e.g., read only memory (ROM) and a data storage area (e.g., random access memory (RAM), and another non-transitory computer readable medium. The electronic processor 24 executes software stored in the memory 26. The software may include instructions for performing methods as described herein.

The input/output interface 28 receives input and provides output. The input can be received via, for example, a keyboard, a pointing device (e.g., a mouse), buttons on a touch screen, a scroll ball, mechanical buttons, and the like. The input can also be received via a communication network, such as the Internet. Output can be provided via, for example, a display device, such as a cathode-ray tube ("CRT"), a liquid crystal display (LCD), a touch screen, and the like. In some embodiments, output can be provided within a graphical user interface ("GUI") (e.g., generated by the electronic processor 24 from instructions and data stored in the memory 26 and presented on a touch screen or other display) that enables a user to interact with the calibration prediction unit 14.

In one embodiment, the calibration prediction unit 14 is configured to perform machine learning functions. For example, as illustrated in FIG. 1, the memory 26 of the calibration prediction unit 14 stores one or more learning engines 29 executable by the electronic processor 24 to process training data and develop a prediction model 30 (i.e., an algorithm). Machine learning generally refers to the ability of a computer application to learn without being explicitly programmed. In particular, a computer application performing machine learning (sometimes referred to as a learning engine) is configured to develop an algorithm based on training data. For example, to perform supervised learning, the training data includes example inputs and corresponding desired (e.g., actual) outputs, and the learning engine 29 progressively develops a prediction model 30 that maps inputs to the outputs included in the training data. Machine learning can be performed using various types of methods and mechanisms including but not limited to decision tree learning, association rule learning, artificial neural networks, inductive logic programming, support vector machines, clustering, Bayesian networks, reinforcement learning, representation learning, similarity and metric learning, sparse dictionary learning, and genetic algorithms.

In some embodiments, the calibration prediction unit 14 can access one or more sources of training data (e.g., the ECU 16 or other external data sources) through one or more communication networks, such as the Internet and other public and private networks. Alternatively or in addition, the calibration prediction unit 14 can store training data in the memory 26 that is accessible by the learning engine 29.

For example, in one embodiment, the calibration prediction unit 14 uses existing vehicle calibration data to develop the prediction model 30. The calibration prediction unit 14 can then use the prediction model 30 and known calibration values for a vehicle (e.g., a new vehicle platform) to predict an unknown calibration value for the vehicle. In particular, the calibration prediction unit 14 can process a vast amount of existing calibration data efficiently to predict new calibration values.

Figure 2:
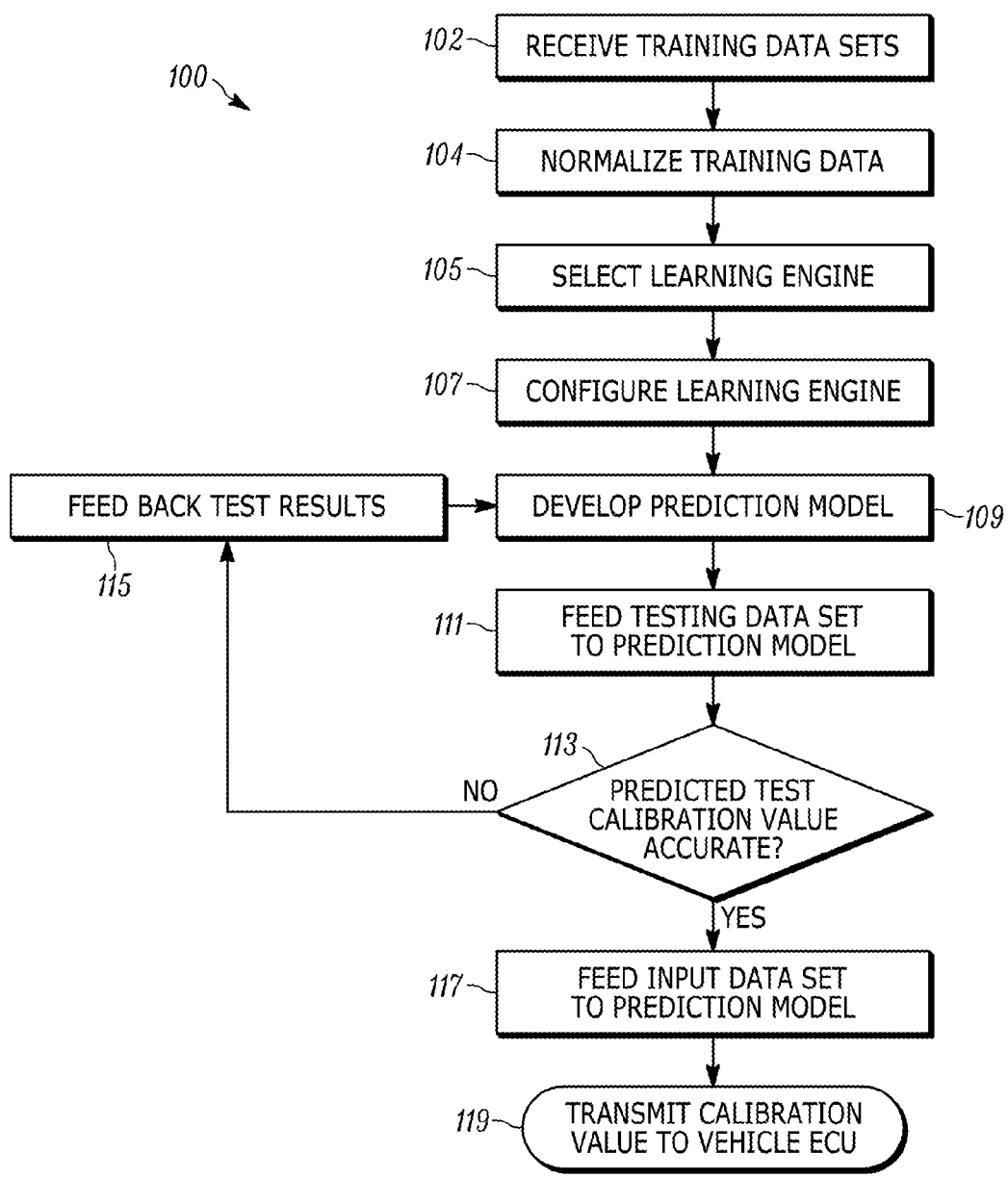
FIG. 2 is a flowchart illustrating a method of automatically predicting calibration values according to some embodiments of the invention.

For example, FIG. 2 illustrates a method 100 performed by the calibration prediction unit 14 to automatically predict calibration values for the fuel injector 20 according to some embodiments of the invention. However, as noted above, the method 100 can be used to predict calibration values for other vehicle systems and subsystems.

Figure 3:
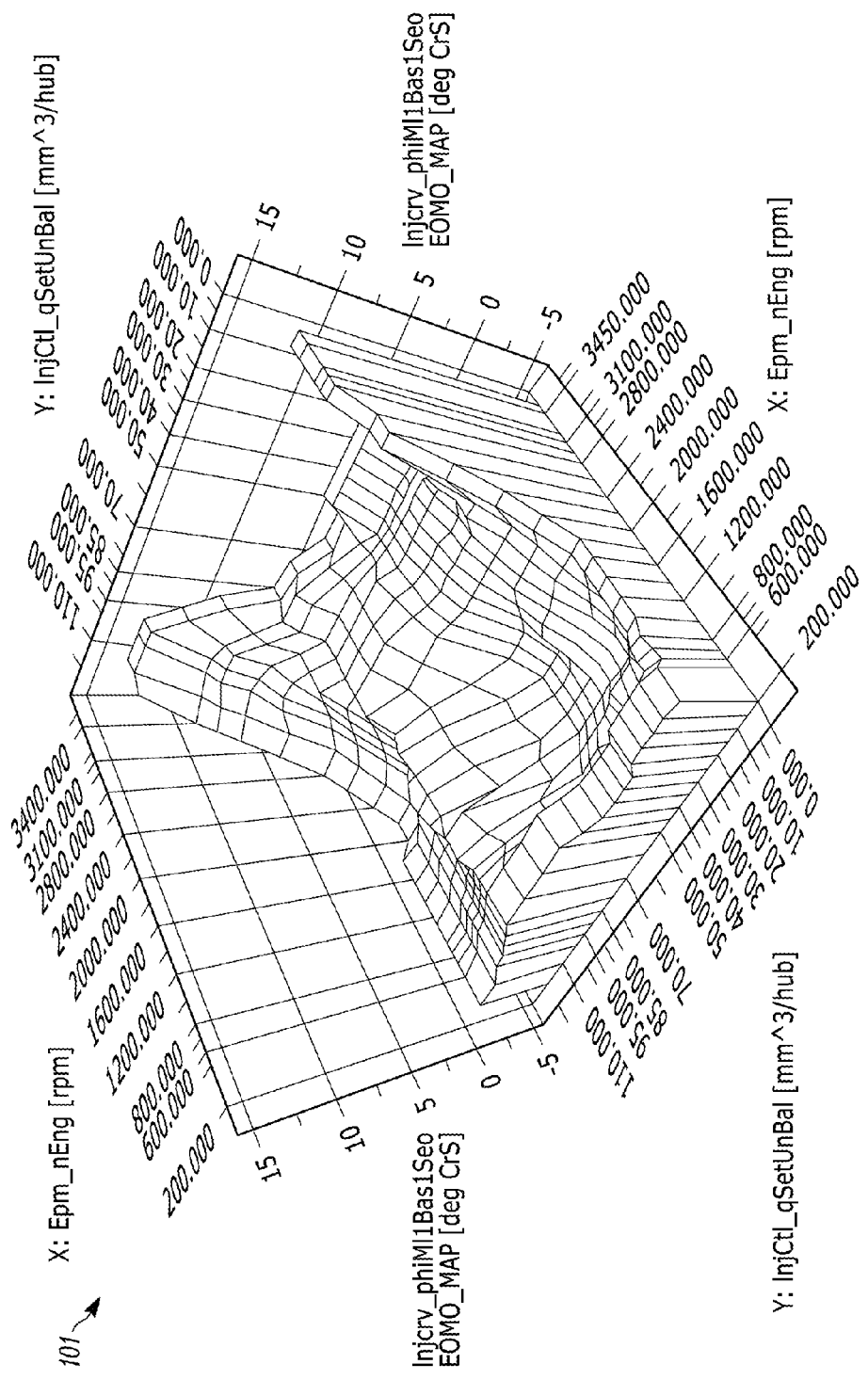
FIG. 3 illustrates a calibration value lookup table for a fuel injection quantity.

As noted above, the ECU 16 controls the fuel injector 20 to inject a quantity of fuel into the cylinders of the engine 18. In some embodiments, the ECU 16 uses a lookup table to determine the quantity of fuel that will be injected by the fuel injector 20. For example, the ECU 16 can determine the injection quantity using a requested engine output torque and a current engine speed as inputs to a lookup calibration table. FIG. 3 is a graphical representation 101 of an example lookup calibration table. When a new vehicle platform is developed, a new lookup calibration table must be populated with calibration values based on the new vehicle platform.

Figure 4:
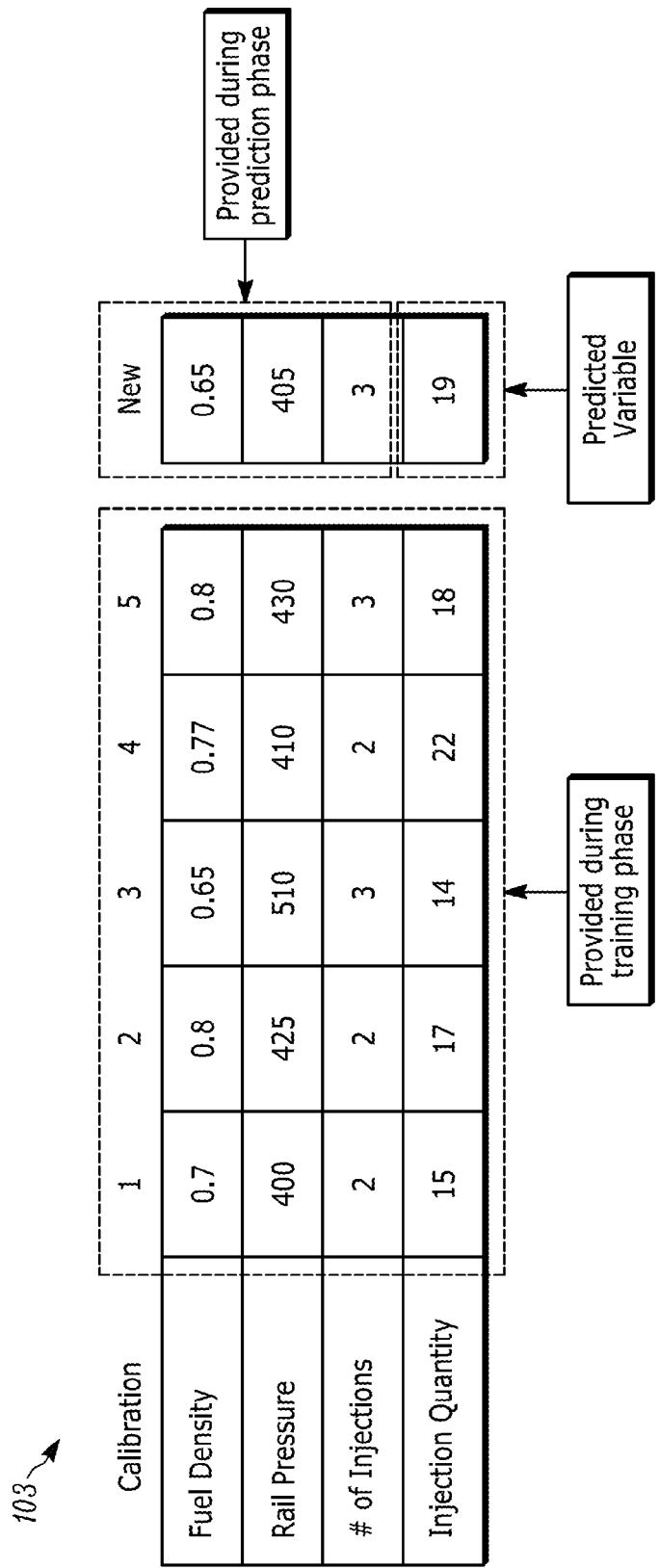
FIG. 4 is a chart illustrating data sets used to develop a prediction model for a fuel injection quantity calibration value.

As illustrated in FIG. 2, to build a new lookup calibration table, the calibration prediction unit 14 receives training data sets (at block 102). Each training data set includes an output representing a calibration value and one or more inputs associated with the output. For example, when predicting calibration values for the fuel injector 20, the output is a fuel injection quantity and the inputs are parameters associated with fuel injection quantity (e.g., requested engine output torque, current engine speed, fuel density, rail pressure, a number of fuel injectors, crank angle of the injections, ambient air temperature, barometric pressure, other environmental conditions, and the like). FIG. 4 is a chart 103 that illustrates sample training data sets that could be used to develop a prediction model 30 for predicting an injection quantity calibration value. Each sample training data set includes three inputs (fuel density, rail pressure, and number of injections) and one output (injection quantity). The training data sets can include historical calibration values and corresponding historical vehicle data collected from one or more vehicles (e.g., by the calibration prediction unit 14 or one or more separate units).

In some embodiments, the calibration prediction unit 14 normalizes the training data sets (at block 104). Normalizing the data can include adjusting for consistency of units, accounting for environmental factors, and eliminating outliers.

As illustrated in FIG. 2, the calibration prediction unit 14 also selects a learning engine 29 for developing a prediction model 30 based on the received training data sets (at block 105). For example, as noted above, the calibration prediction unit 14 can store multiple learning engines. Therefore, in some embodiments, the calibration prediction unit 14 uses the training data sets to select one of the available learning engines. For example, the calibration prediction unit 14 can be configured to create a histogram of the outputs included in the training data sets. The histogram may be used to determine what type of analysis could be used to develop the prediction model 30 for the training data sets. For example, if the histogram shows a wide distribution of values, then a regression analysis is more suitable. In another example, it may be better to use a classification analysis because a finite number of possible values improves the chances of predicting correctly. For example, with only two possible values, there is a 50% chance of predicting correctly. Thus, for such a small range, a classification analysis leads to improved chances for an accurate prediction, especially when compared to a larger range of values (for example, from 1-50). In other cases, a histogram may show similarities in the data that call for clustering of some of the data as a pre-cursor to a classification analysis. A histogram can also be used to determine anomalies or outliers in the data, which can be used to pre-process the data prior to submitting the data to a learning engine as training data.

After selecting the learning engine 29, the calibration prediction unit 14 selects one or more values for configuration parameters for the selected learning engine 29 (at block 107). As known to one skilled in the art, configuration parameters vary with the choice of learning engine type. They can include, for example, a number of iterations or a desired accuracy. The calibration prediction unit 14 can also select values for the configuration parameters based on the type, size, and variance of the received training data sets.

The calibration prediction unit 14 then feeds the training data sets to the learning engine 29 to develop the prediction model 30 (at block 109). The learning engine 29 uses the training data sets to create the prediction model 30 that models how the outputs included in the training data sets were historically configured based on the historical vehicle data using one or more machine learning techniques and the selected values for the configuration parameters.

In some embodiments, the calibration prediction unit 14 tests the prediction model 30 generated by the learning engine 29. For example, as illustrated in FIG. 2, the calibration prediction unit 14 can feed a testing data set to the prediction model 30 (at block 111). The calibration prediction unit 14 can select the testing data set from the training data sets and, in particular, can feed the prediction model 30 the one or more inputs associated with one of the training data sets.

The calibration prediction unit 14 then determines a difference between the one or more outputs from the prediction model 30 and the corresponding one or more outputs associated with the testing data set from the selected training data sets (at block 112). The difference between the outputs from the prediction model 30 and the actual outputs from selected training data sets indicates an accuracy of the prediction model 30. If the difference does not satisfy a predetermined threshold (e.g., exceeds the predetermined threshold indicating that the generated output varies too much from the actual output), the calibration prediction unit 14 refines the prediction model 30 (at block 115). For example, in some embodiments, the calibration prediction unit 14 feeds the results of the test back to the learning engine 29 to further develop (i.e., further refine) the prediction model 30. As illustrated in FIG. 2, the testing and refinement can be repeated until the accuracy of the prediction model 30 satisfies the predetermined threshold. In some embodiments, each of the training data sets can be used as a testing data set in a sequential fashion.

When the accuracy of the prediction model 30 satisfies the predetermined threshold, the calibration prediction unit 14 uses the prediction model 30 to predict a calibration value. For example, as illustrated in FIG. 2, the calibration prediction unit 14 can feed an input data set (e.g., associated with a new vehicle configuration or model) (see FIG. 4) to the prediction model 30 (at block 117) and the prediction model 30 outputs a predicted calibration value based on the input data set (at block 118). The calibration prediction unit 14 then transmits the predicted calibration value to the ECU 16 (at block 119), which can apply the predicted calibration value to control the fuel injector 20. In some embodiments, the calibration prediction unit 14 can feed the prediction model 30 multiple different input data sets and use the resulting the predicted calibration values to build a lookup table (e.g., an injection quantity lookup table) for the ECU 16. The lookup table includes the predicted calibration value and the corresponding input data set and predicted calibration values for other input data sets. Accordingly, the calibration prediction unit 14 can transmit individual predicted calibration values or a complete lookup table to the ECU 16.

Thus, the invention provides, among other things, a systems and methods for predicting calibration values for a vehicle. Various features and advantages of the invention are set forth in the following claims.

What is claimed is:

1. A system for predicting a calibration value for a vehicle, the system comprising:
   an electronic processor configured to;
      receive a plurality of training data sets for a vehicle component;
      automatically develop a prediction model based on the plurality of training data sets;
      receive an input data set;
      determine, using the prediction model, a predicted calibration value based on the input data set; and
      transmit the predicted calibration value to an electronic control unit included in the vehicle;
      wherein each of the plurality of training data sets includes one or more inputs and one or more corresponding outputs.

2. The system of claim 1, wherein transmitting the predicted calibration value to the electronic control unit includes transmitting a lookup table to the electronic control unit, the lookup table including the input data set and the predicted calibration value.

3. The system of claim 1, wherein the electronic processor is configured to transmit the predicted calibration value to the electronic control unit over at least one connection external to the vehicle.

4. The system of claim 1, wherein automatically developing the prediction model includes selecting a learning engine from a plurality of learning engines.

5. The system of claim 4, wherein the electronic processor is configured to select the learning engine from the plurality of learning engines based on the plurality of training data sets.

6. The system of claim 5, wherein the electronic processor is configured to select the learning engine from the plurality of learning engines based on the plurality of training data sets by generating a histogram based on the plurality of training data sets.

7. The system of claim 4, wherein the electronic processor is further configured to determine at least one value for a configuration parameter associated with the learning engine based on the plurality of training data sets.

8. The system of claim 7, wherein the at least one value for the configuration parameter includes an iteration value.

9. The system of claim 1, wherein the electronic processor is further configured to
   select a testing data set from the plurality of training data sets, the testing data set including one or more inputs and one or more corresponding outputs;
   determine, using the prediction model, a predicted test calibration value based on the one or more inputs included in the testing data set;
   compare the predicted test calibration value to the one or more outputs included in the testing data set to determine an accuracy for the prediction model; and
   refine the prediction model based on the testing data set when the accuracy does not satisfy a predetermined threshold.

10. The system of claim 1, wherein the input data set includes a fuel density, a fuel rail pressure, and a number of fuel injectors and the predicted calibration value includes a fuel injection quantity.

11. A method of predicting a calibration value for a vehicle, the method comprising:
   receiving, with an electronic processor, a plurality of training data sets for a component of the vehicle, wherein the each of the plurality of training data sets includes one or more training inputs and one or more corresponding training outputs;
   automatically developing, with the electronic processor, a prediction model based on the plurality of training data sets;
   receiving, with the electronic processor, an input data set;
   determining, with the electronic processor using the prediction model, a predicted calibration value based on the input data set; and
   transmitting, with the electronic processor, the predicted calibration value to an electronic control unit included in the vehicle.

12. The method of claim 11, wherein transmitting the predicted calibration value to the electronic control unit includes transmitting a lookup table to the electronic control unit, the lookup table including the input data set and the predicted calibration value.

13. The method of claim 11, further comprising:
   transmitting, with the electronic processor, the predicted calibration value to the electronic control unit over at least one connection external to the vehicle.

14. The method of claim 11, wherein automatically developing the prediction model includes selecting a learning engine from a plurality of learning engines.

15. The method of claim 14, wherein selecting a learning engine from a plurality of learning engines includes selecting the learning engine from a plurality of learning engines based on the plurality of training data sets.

16. The method of claim 15, wherein selecting the learning engine from a plurality of learning engines based on the plurality of training data sets includes generating a histogram based on the plurality of training data sets.

17. The method of claim 14, further comprising:
   determining, with the electronic processor, at least one value of a configuration parameter associated with the learning engine based on the plurality of training data sets.

18. The method of claim 17, wherein determining the at least one value of the configuration parameter includes determining, with the electronic processor, an iteration value.

19. The method of claim 11, further comprising:
   selecting, with the electronic processor, a testing data set from the plurality of training data sets, the testing data set including one or more inputs and one or more corresponding outputs;

determining, with the electronic processor, using the prediction model, a predicted test calibration value based on the one or more inputs included in the testing data set;

comparing, with the electronic processor, the predicted test calibration value to the one or more outputs included in the testing data set to determine an accuracy for the prediction model; and refining, with the electronic processor, the prediction model based on the testing data set when the accuracy does not satisfy a predetermined threshold.

20. The method of claim 11, wherein the input data set includes a fuel density, a fuel rail pressure, and a number of fuel injectors and the predicted calibration value includes a fuel injection quantity.

* * * * *